June 23, 1970  R. P. KAPLAN  3,516,557
POSITIONAL CONTROL MEANS FOR A MATERIAL HANDLING
AND STORAGE SYSTEM
Filed Oct. 23, 1968

INVENTOR
ROBERT P. KAPLAN

BY Frank A. Seemar
ATTORNEY

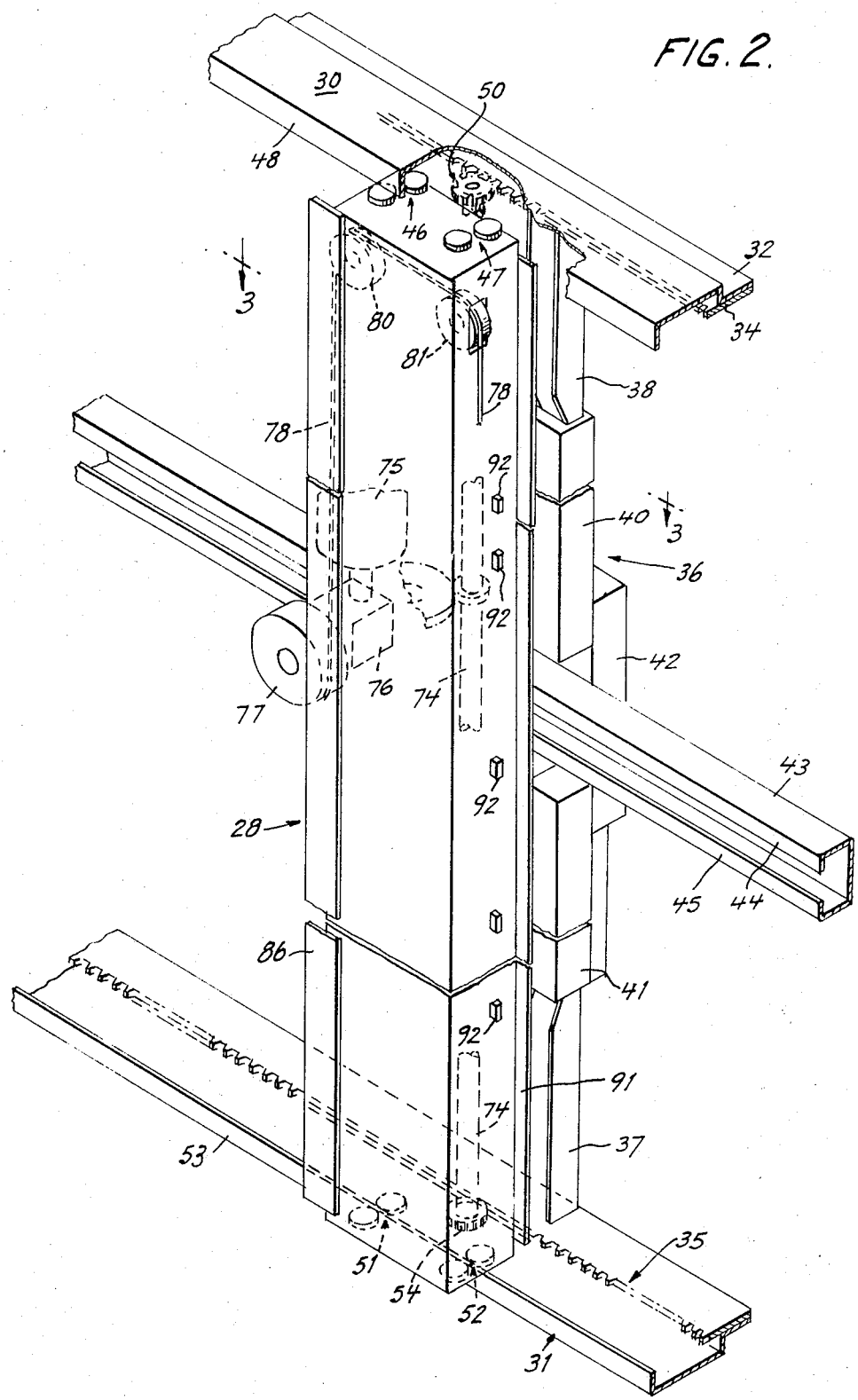

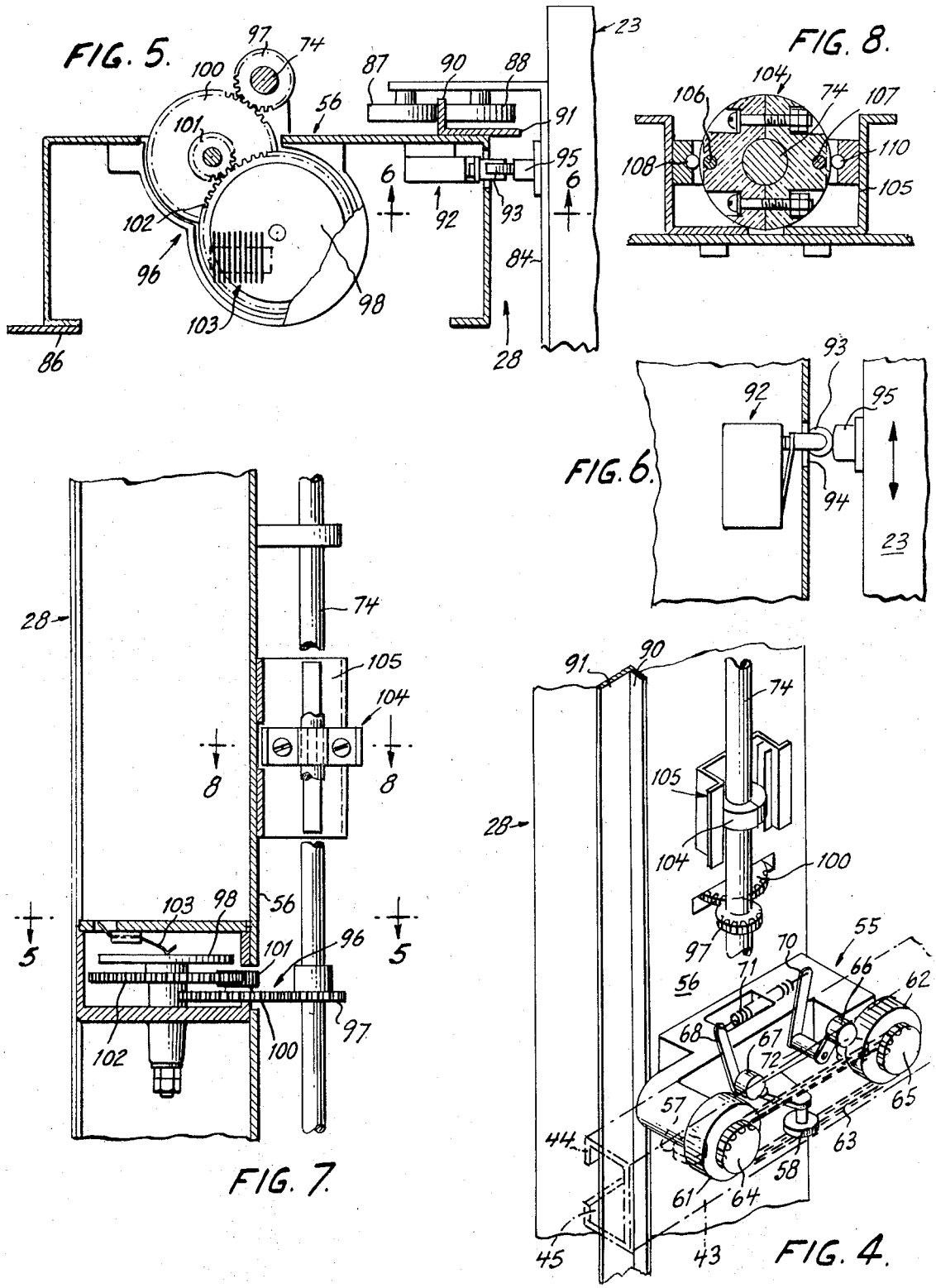

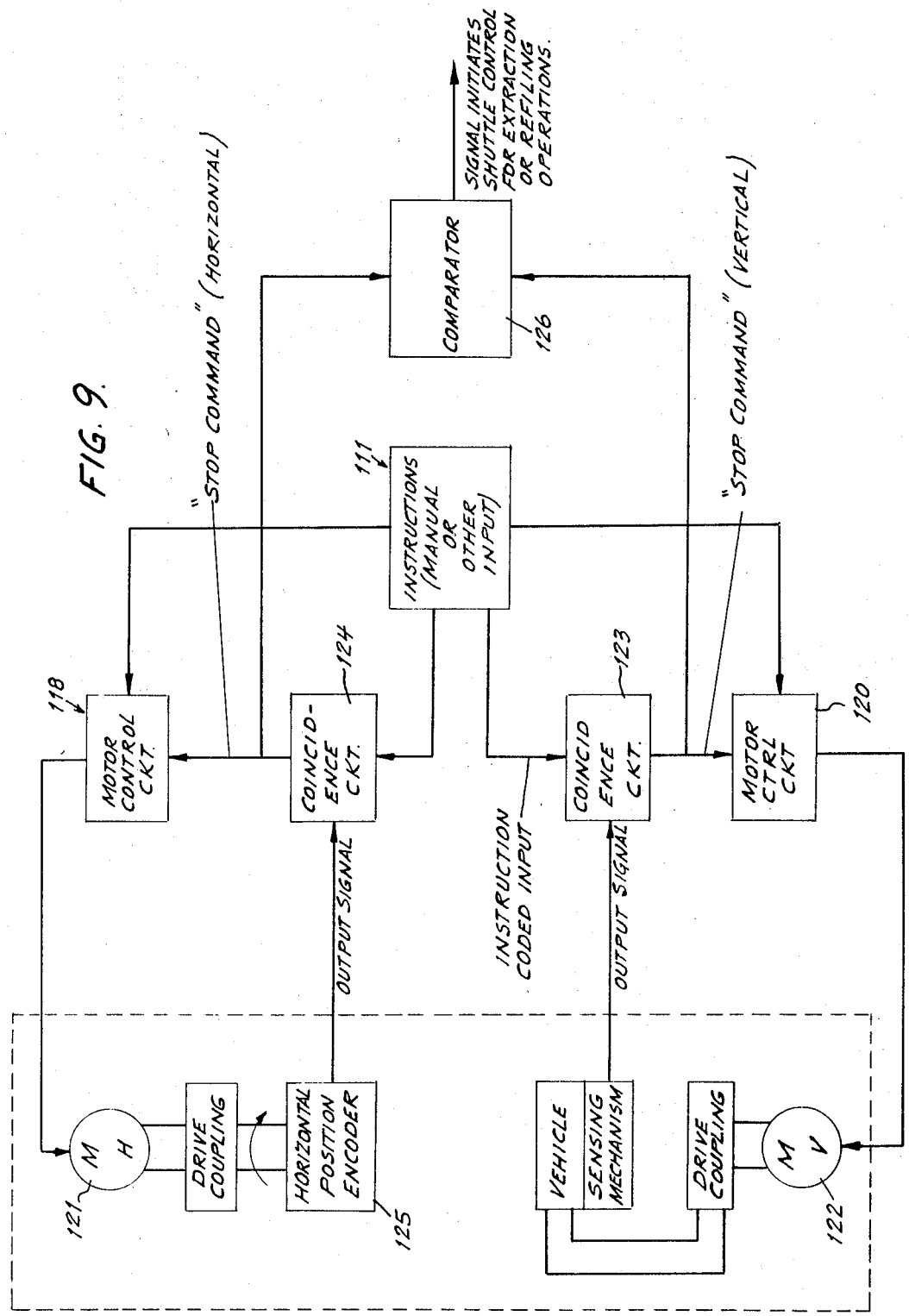

United States Patent Office 3,516,557
Patented June 23, 1970

3,516,557
POSITIONAL CONTROL MEANS FOR A MATERIAL
HANDLING AND STORAGE SYSTEM
Robert P. Kaplan, Tonawanda, N.Y., assignor to Sperry
Rand Corporation, New York, N.Y., a corporation of
Delaware
Filed Oct. 23, 1968, Ser. No. 769,934
Int. Cl. B65g 1/00
U.S. Cl. 214—16.4                                    7 Claims

ABSTRACT OF THE DISCLOSURE

An article-handling system comprising one or more aisles in which a vehicle is disposed on a vertical column which traverses in a path adjacent accessible storage modules. The vehicle is adapted to automatically retrieve or replace articles normally stored in the modules. Appropriate controls are provided whereby the vehicle is translated to a position adjacent a predetermined module for automatic transfer of an article between an article receiving compartment in the vehicle and the storage array. Positioning of the vehicle is accomplished by remotely determining the address of a selected article and signaling the column accordingly. The column is driven horizontally in accordance with the sensed physical position thereof, and positioning of the vehicle is determined by signals derived by virtue of relative vehicle position along the column. Askew-free columnar travel is assured by virtue of a torsion rod mechanism adapted to maintain the vertical stability of the coloumn regardless of vehicle disposition at extremities of the column. A position sensing arrangement is associated with the torsion rod mechanism and provides accurate alignment between the vehicle and a selected article.

BACKGROUND OF THE INVENTION

The present invention relates to an improved article-handling system and more particularly to a new and useful arrangement for accurately positioning an article-carrying vehicle.

There are many present day methods to selectively retrieve articles from storage. Known systems vary from simple manual arrangements to complex automated equipment. Many factors are considered in determining the type of system which should be employed for a particular application. These factors include the necessity of economic considerations, the field or business involved, the type, size, and shape of the articles, space available, etc. For the purposes of the present invention, an article will be construed to mean any single discrete article and thereby encompass widely diverse field such as bulky warehousing or minified records media. Regardless of the field, many common problems have been encountered in the implementation of automated retrieval systems, one of which is the need for accurate positioning of the retrieval mechanism utilized.

An examplary system of the nature referred to above is shown in copending patent application bearing Ser. No. 675,453, filed Oct. 16, 1967 now U.S. Patent 3,463,566, entitled, "Automatic Article-Handling System," and assigned to a common assignee. That application is directed to a system comprising apparatus for storing a plurality of discrete articles at predetermined known locations identified by a coded address, an operator work station for controlling and having access to the system, retrieval apparatus for automatically transporting any selected article from storage to the operator, and refiling apparatus for automatically returning to storage any coded article. A plurality of aisles are shown, each of which has an identical but independently operating mechanism for handling articles stored in such respective aisles.

The present invention is adaptable for general use in the type of system described above but is particularly directed to only that portion invloved in a singular aisle. More specifically, the invention facilitates the positioning of the column mechanism in its horizontal path of travel. Any system requiring the accurate positioning of a traversable mechanism lends itself to improvement by the present invention as will become apparent from the detailed description hereinbelow.

SUMMARY OF THE INVENTION

An improved control mechanism is contemplated by the present invention for use in an article-handling system for automatically transporting a discrete article between first and second predetermined locations. In one embodiment the mechanism is adapted for utilization in a system including a work station, an array of storage modules arranged in a vertical tier, and a plurality of descrete articles each of which is associated with a particular module having a coded address. The system further includes a carrier for transporting a selected article between the module associated therewith and the work station, which carrier includes a vertically extending column operable adjacent the vertical tier, a horizontal drive for driving the column along a horizontal path, and an article-accommodating vehicle adapted to be driven vertically along the column whereby it is positionable adjacent any selected module. The improved control mechanism of the present invention functions in response to remote commands to efficiently operate the vehicle position by determining the selective energization of the vertical and horizontal drives.

More specifically, the described embodiment is directed to a control mechanism including an encoder comprising a shaft mounted on the column and adapted to rotate in a linear relationship with the displacement of the horizontal column and a sensing arrangement responsive to the shaft position. A control signal representative of the relative shaft rotation is coupled to the horizontal drive, whereby coincidence of the shaft position and a corresponding selected command results in controlled de-energization of such horizontal drive. The cooperating vertical portion of the control mechanism operates concurrently by virtue of switching means positioned on the column in a manner enabling an output for identifying the various predetermined vertical positions of the vehicle. Accordingly, a command signal is coupled to a vertical drive whereupon coincidence of such signal and the switching means output results in deenergization of the vertical drive.

Thus, the vehicle is selectively positioned adjacent any one of the several storage modules and any desired function may then be carried out, e.g., transfer of an article between the module in the storage tier and an article-receiving cavity in the vehicle. Several particular improved functions of the horizontal positioning mechanism will become more apparent in the following description of the more specific functions of the various elements thereof.

The foregoing and other objects, features, and advantages of the invention will appear more fully hereinafter from a consideration of the details description which follows, in conjunction with the accompanying sheets of drawings wherein one principal embodiment of the invention is illustrated by way of example. It is be expressly understood, however, that the drawings are for illustrative purposes only and are not to be construed as defining the limits of the invention.

BRIEF DESCRIPTION OF THE DRAWINGS

FIG. 2 is a perspective view of the vertical column mechanism utilized in the system shown in FIG. 1.

FIG. 4 is a perspective view showing details of the drive mechanism for the vertical column shown in FIG. 2.

FIG. 5 is a sectional view taken along line 5—5 of FIG. 7.

FIG. 6 is a sectional view taken along line 6—6 of FIG. 5.

FIG. 7 is a cutaway side elevation showing a portion of the column control mechanism.

FIG. 8 is a sectional view taken along line 8—8 of FIG. 7.

FIG. 9 is a block diagram illustrating the overall operation of the system embodying the present invention.

BRIEF DESCRIPTION OF PREFERRED EMBODIMENT

Figure 1:
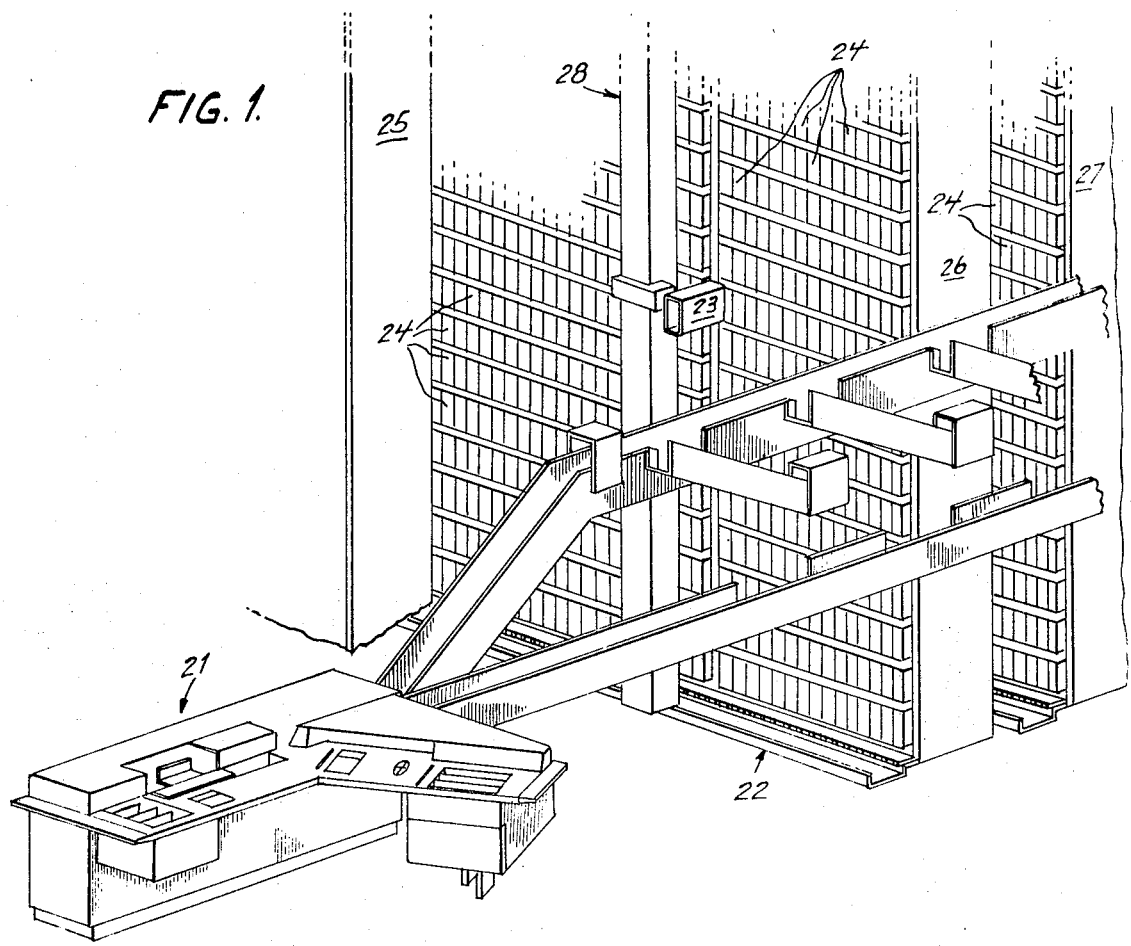
FIG. 1 is a perspective view of the general system in which the present invention may be readily employed.

Now, referring to the drawings for a more detailed description, an article-handling system is shown in FIG. 1 to illustrate, by way of example, an embodiment of one type of system with which the present invention may be used. United States patent application, (mentioned above), Ser. No. 675,453, filed Oct. 16, 1967, entitled, "Automatic Article-Handling System," and assigned to a common assignee, describes in further detail a system of this nature. For the purposes of the present description, the FIG. 1 system is depicted to set forth the combination in which the novel apparatus operates while also illustrating apparatus having those aspects common to article-retrieval systems that are generally susceptible to improvement by the present invention.

Prior to describing the structure of the improved system in further detail, the general operational aspects of the FIG. 1 system will be discussed. Reference numerals 20, 21, and 22 respectively, designate an article-storage array, a work station, and intermediate transport apparatus. Under normal circumstances, this system operates by entering input command signals at station 21 in response to which a retrieval vehicle 23 withdraws any one of the many article-carrying containers 24 in accordance with the particular command initiated by the operator. The selected container is then delivered to station 21 via transport apparatus 22 for appropriate follow-up action. When access to such retrived container 24 is no longer necessary, the container is refiled in storage array 20 via a return portion of transport apparatus 22.

Storage array 20 includes a plurality of multibay tiers 25, 26, and 27 arranged in opposing relationship and defining aisles in the face-to-face fashion of library book stacks, or the like. Each aisle has disposed therein, a vertical column 28 (one of which is diagrammatically illustrated in the system of FIG. 1) for supporting vehicle 23 which may be selectively driven by appropriate control means to any of the several vertical positions corresponding to the storage shelves. Thus, by virtue of the additional capability of the column to horizontally traverse the aisle in which it is disposed, the vehicle may be positioned along orthogonal axes for handling articles in any one of the individual storage bays on either side of the aisle in question. To this end, vehicle 23 is provided with those mechanisms required to effect transfer of containers from and to their stored position. Specific vehicle structure for carrying out these functions is described in copending patent application bearing Ser. No. 618,119, filed Feb. 23, 1967, entitled, "Article-Handling Apparatus," and assigned to a common assignee. The horizontal drive mechanism for column 28 includes a gear and rack arrangement which is described in further detail hereinbelow insofar as its interrelationship with the apparatus of the present invention is concerned. With respect to the vertical drive means for vehicle 23, it will be described in detail to the extent that it is related to the function of the present invention; however, means such as a gear and rack arrangement could suffice as would be readily ascertainable by a skilled artisan.

Now turning to the column 28 shown in detail at FIG. 2, the horizontal positioning mechanism therefor comprises an upper horizontal rail 30 and a lower horizontal rail 31 extending in lateral spaced relation therewith. These rails are fabricated from channel-like stock, each having a flange extension 32 and 33, respectively, for supporting similar toothed racks 34 and 35. Rails 30 and 31 are affixed to a plurality of support elements 36 on the adjacent storage array, and extend in spaced parallel fashion therefrom. More specifically, racks 34 and 35 are secured to a vertically extending column-like member constructed from channel-shaped elements 37 and 38 extending with aligned tubular elements 40 and 41, which are in turn secured at their opposing inwardly facing ends to a third tubular element 42 to form a recess. A guideway 43, fabricated from channel stock with inwardly turned opposing flanges 44 and 45, is affixed and extending in parallel relation between rails 30 and 31; whereby the sides thereof are appreciably spaced from the ends of elements 40 and 41 in the recess formed therebetween.

Figure 3:
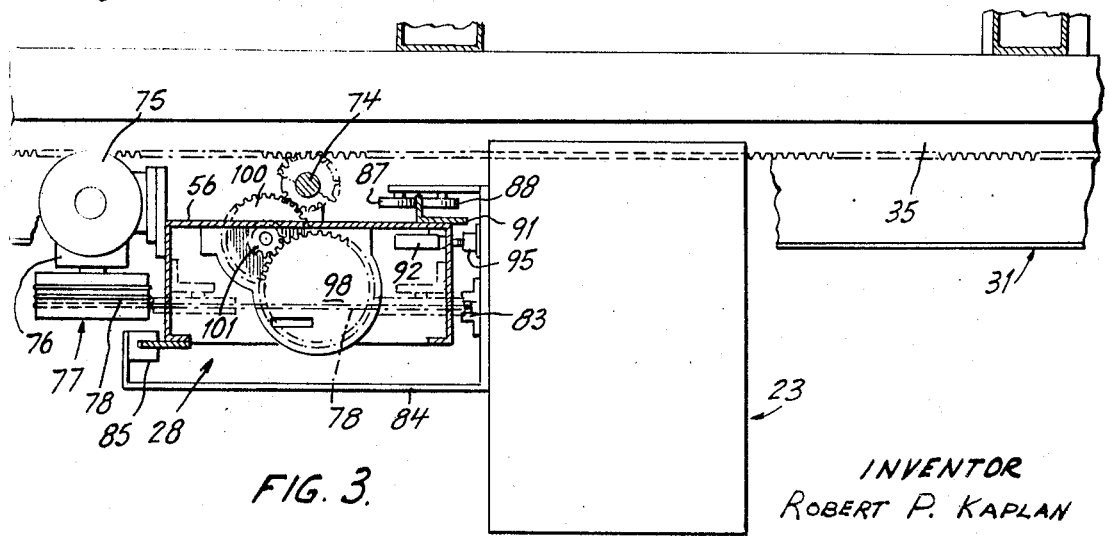
FIG. 3 is a sectional view taken along line 3—3 of FIG. 2.

Vertical article-retrieving column 28 is also shown in section at FIG. 3 in its general relationship with respect to vehicle 23 and various drive elements. The column is provided with roller pairs 46 and 47 for providing horizontal guidance and maintaining vertical alignment. This cooperative relationship between the roller pairs and rail flange 48 horizontally guides the column while effectively maintaining a pinion gear 50 in contact with rack 34. roller pairs 51 and 52 register in the same manner with a flange 53 of rail 31 to maintain a second pinion gear 54 in proper mesh with rack 35. To further assure proper guidance and stability and to contribute to the horizontal drive function, mechanism 55 (FIG. 4) mounted on the back wall 56 of column 28 includes rollers 57, 58, and 60 bearing against lower flange 45 of guideway 43. More specifically, the principal horizontal drive of vertical column 28 is effected by driven rollers 61 and 62 extending rearwardly from the housing of mechanism 55. These rollers are operatively connected by a drive chain 63 via sprocket wheels 64 and 65, which in turn are affixed to rotate in concert with rollers 61 and 62. Frictional engagement between rollers 61 and 62 and guideway 43 is maintained by the weight characteristics of the column, and is further enhanced by and maintained by rollers 66 and 67 urged against the downwardly facing inner surface of guideway 43. Lever arms 68 and 70 are operatively connected by a spring 71 under tension for urging pivot pins 72 (only one shown) in opposite rotational directions to thereby urge rollers 66 and 67 upward by virtue of the opposing moments on lever arm 73 upon which they are mounted. The actual drive means (not shown) may include a motor and motor coupling mounted in or on column 28 and energized via a trolley track arrangement, a horizontal commutator or a draped cable, all of which are common expedients and not shown for the purposes of this invention.

Also contributing to the horizontal drive function is the combination of traveling pinion gears 50 and 54 affixed to and rotating with a shaft 74 which is mounted in suitable sleeve bearings, or the like, extending from the back wall 56 of column 28. This shaft can readily be driven from a source common to the drive source for friction rollers 61 and 62. Furthermore, the drive could be effected with either the rollers alone or the pinion arrangement alone depending on the relative size and speed requirements of the overall system. It should also be noted that the relative horizontal position of colum 28 is determined by the number of rotations of shaft 74, or the number of teeth in racks 34 and 35 over which pinions 50 and 54 traverse, respectively. To this end the rotation of shaft 74 can be counted via appropriate means (described hereinbelow) to determine the column position.

A further important function of shaft 74 is its ability to provide vertical stability for the column during horizontal traversal thereof over its path determined by rails 30 and 31 and guideway 43. More specifically, yaw is effectively eliminated to the extent torsion in the interconnecting shaft 74 can be prevented. This feature is not only desirable, but necessary in a system where positional accuracy of the entire column 28 is a principal factor. Regardless of whether shaft 74 is driven or functions as a follower, its function as a stabilizer is not affected.

Vehicle 23, which is driven along column 28 is selectively positionable adjacent any particular stored article, comprises structure of the nature described in copending U.S. patent application, Ser. No. 618,119, filed on Feb. 23, 1967, entitled, "Atrticle-Handling Apparatus." This application is mentioned, of course, for exemplary purposes only, in that any vehicle mechanism could be used without affecting the scope of the present invention. Accordingly, the vehicle 23 is only diagrammatically illustrated (FIG. 3). Vertical positioning is effected by a motor 75 (FIG. 2) which is coupled via control means 76 to a capstan 77 about which a cable 78 is wrapped. The cable extends over idler rollers 80 and 81 and terminates at bracket 83 (FIG. 3) affixed to vehicle mounting frame 84. Bearing element 85, secured to frame 84, slides along strip 86, which is in turn secured to column 28 (see FIG. 2). A pair of rollers 87 and 88 are mounted on the opposite end of frame 84 and cooperate with a flange 90 extending from strip 91 also secured to column 28. Accordingly, vehicle 23 is driven upwardly along column 28 when motor 75 is energized to wind cable 78 on capstan 77 and downwardly when capstan 77 is rotated in the opposite direction.

A plurality of switches 92 are mounted on column 28 at predetermined locations. Each switch includes an actuator 93 (see FIGS. 5 and 6) extending through an aperture 94 in the side of the column adjacent vehicle 23. A camming element 95 is secured to vehicle 23 to selectively engage the switch actuators when the vehicle passes the vertical position associated therewith.

Now turning to the device used for sensing the horizontal position of column 28, FIG. 7 shows a gear train 96 which is associated with shaft 74 by gear 97, whereby a revolution of shaft 94 results in an incremental turn of an encoder disc 98. More specifically, gear 97 meshes with a gear 100 in a step down manner, and a gear 101 rotating with gear 100 meshes with a gear 102 in a second step down phase to drive disc 98. Thus, the increment of rotation of disc 98 is directly proportional to the number of revolutions of shaft 74 which is linearly proportional to the distance column 28 travels in its path defined by guideway 43. A plurality of contact members 103 are arranged to contact disc 98 (FIGS. 5 and 7) whereby it becomes apparent that pick-up of the disc position makes possible the origination of an analogous electrical signal. Coded conductive and nonconductive areas in a pattern on disc 98 are utilized in a known manner for this purpose.

FIG. 4 also shows a second sensing means associated with shaft 74. A collar member 104 is adjustably affixed (FIG. 8) to shaft 74 and rotates therewith within the confines of generally U-shaped bracket 105. A pair of magnetic flux producing members 106 and 107 are embedded in collar 104 at diametrically opposed positions. The flux eminating therefrom is adequate to operate a pair of reed switches 108 and 110, mounted in opposition on the interior surface of bracket 105, under conditions where the switches are disposed directly opposite said members. Adjustment of collar 104 with respect to shaft 74 is effected by loosening the nut and bolt assemblies and rotating the collar assembly. Thus, the position at which the reed switches are activated can be accurately determined with respect to the increment of angular rotation of shaft 74.

Figure 10:
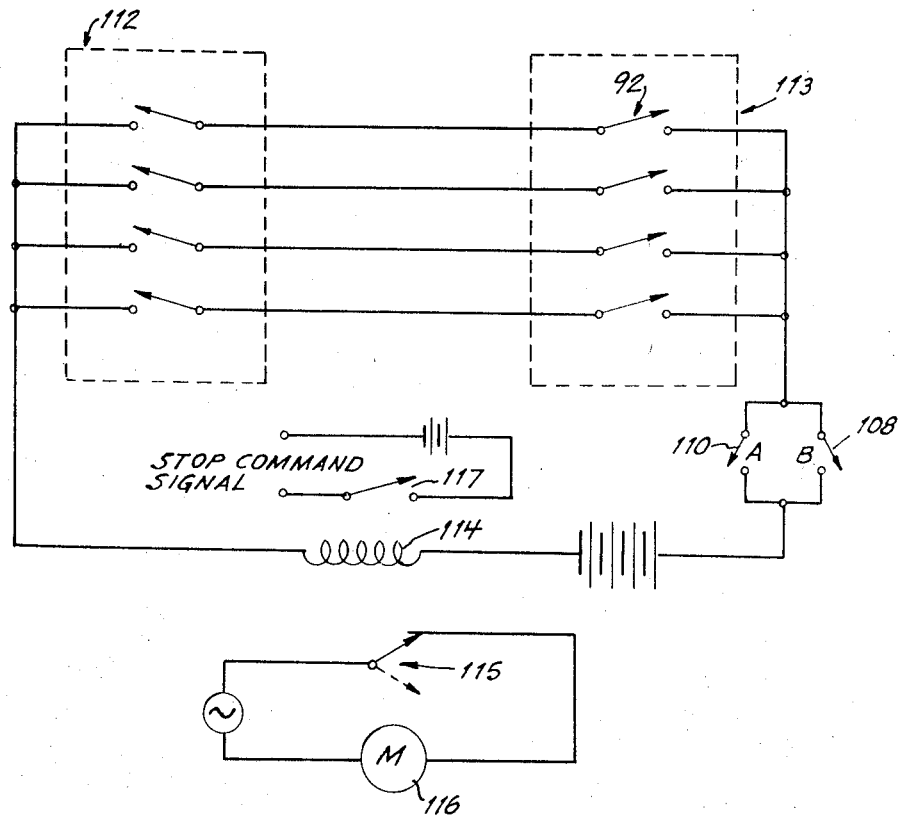
FIG. 10 is a schematic diagram of a coincidence switching array utilized in the preferred embodiment of the present invention.

In operation, instructions are entered at work station 21 shown as block 111 in FIG. 9. These instructions comprise the selection of a particular position in the storage array to which it is desirable to translate vehicle 23. For example, the orthogonal coordinates (address) of the position could be identified by one of a bank of switches, for both vertical and horizontal positions. In FIG. 10, an illustrative bank 112 is shown for one axis along which four positions are possible. In series with each switch in bank, 112 is a switch in a bank 113 corresponding to four actual positions, e.g., four switches 92 on column 28. Both switch banks 112 and 113 are connected in parallel with reed switches 108 and 110, which are in parallel with each other. Thus, if either reed switch is closed and two corresponding switches in banks 112 and 113 are closed, a pulse passes through relay coil 114, which pulse opens contacts 115 and deenergizes motor 116. The pulse through the relay coil can be used for various signaling purposes such as the "STOP COMMAND SIGNAL" shown by the closure of contacts 117.

The instructions at block 111, in the form of the switching briefly illustrated above, is coupled to motor control circuitry 118 and 120 for driving motors 121 and 122, and is also coupled to coincidence circuitry 123 and 124. Horizontal position encoder 125 is coupled to the horizontal motor and provides an output signal for comparison to the instruction signal for a selected horizontal position. Thus, when coincidence occurs, an output signal is provided as well as a "Stop" command as illustrated in the FIG. 10 schematic. Likewise, the vertical motor provides an output signal to coincidence circuitry 123 and a "Stop" command for utilization in comparator circuitry 126, which may be routed to any one or several other circuits to initiate or stop other functions throughout the system.

Figure 11:
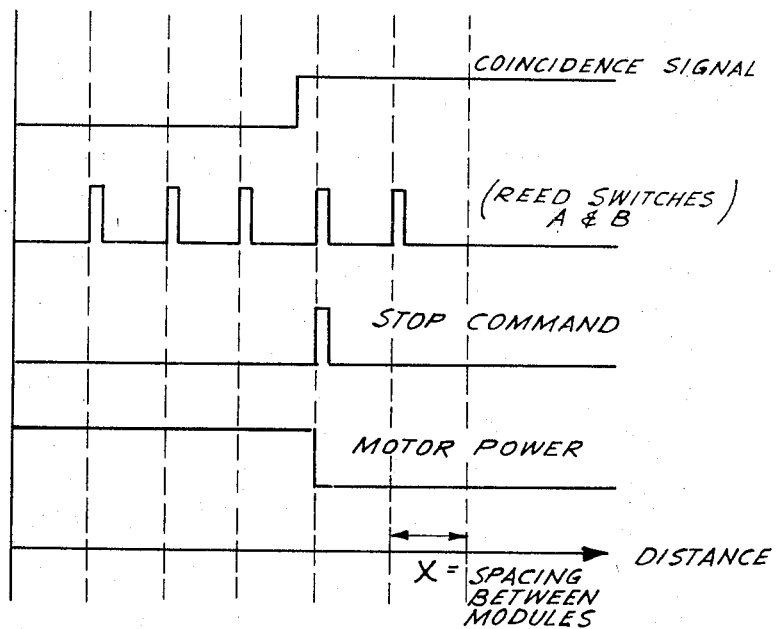
FIG. 11 shows timing diagrams of signals involved in the system of the present invention.

A timing diagram is shown in FIG. 11 to further illustrate the spacial relationships of various electrical signals throughout the system. Assuming operation along one axis, subsequent to the occurrence of a coincidence condition, the next occurring reed switch will close causing the motor power to be interrupted and a stop command signal to be initiated. It should be noted that the spacing of modules on the storage racks is the principal determining design factor of the instant system, i.e., distance $x$ is the spacing from the edge of one module to the edge of the next adjacent module. Therefore, the reed switches are alternately closed as the column travels along its horizontal path. This feature of the present invention makes possible accurate motor deenergization at a selected module; however, the accurate control feature is obviously the pertinent factor and not the related fact that it is especially adapted for the system of the present embodiment. Regardless of inaccuracies in the method used to initiate the coincidence signal, e.g., gear train slippage, the collar 104 can be accurately positioned with respect to the increments of spacing and thereby accurately determine exactly when the stop command will be initiated with respect to the cycle of operation.

Although a specific embodiment of the invention has been illustrated and described in detail by way of example, it is to be understood that the invention is not limited thereto. Various changes may be made in the design and arrangement of parts without departing from the spirit and scope of the invention as defined by the appended claims, as will now be understood by those skilled in the art.

What is claimed is:
1. Article-handling apparatus for automatically transporting an article between first and second locations, said apparatus comprising:
   (a) a work station including input means for entering commands,
   (b) a plurality of discrete articles,
   (c) a storage array comprising modules for accommodating said articles in one or more vertical tiers,
   (d) carrier means for transporting a selected article between said storage array and said work station, said carrier means including a vertically extending column operable adjacent one of said tiers, said carrier means further including guide means defining a horizontal path of travel, and column drive means for driving said column along said path,
   (e) a vehicle for carrying said selected article,
   (f) vehicle drive means for driving said vehicle along said column,
   (g) first and second means for simultaneously energizing said vehicle and column drive means respectively in response to commands entered at said work station,
   (h) encoder means comprising a shaft mounted on said column and adapted for rotation in a linear relationship with the horizontal displacement of the column, said encoder including first and second sensing means responsive to the shaft position, and first coincidence means for coupling said input means to said sensing means for providing a signal representative of said shaft rotation,
   (i) first control circuit means for connecting said signal to said column drive means whereby the occurence of a predetermined shaft position corresponding to a selected command deenergizes said first energizing means,
   (j) a plurality of switches distributed on said column to identify a like plurality of predetermined vertical positions of said vehicle,
   (k) means extending from said vehicle for selective cooperation with said switches,
   (l) second coincidence means for coupling said input means to said switches for providing a signal representing a selected vertical position of the vehicle, and
   (m) second control circuit means for coupling said vertical position signal to said vehicle drive means whereby the occurence of a predetermined vehicle position corresponding to a selected command results in deenergization of said vertical drive means.

2. Article-handling apparatus as set forth in claim 1 wherein said first sensing means comprises:
   first driven means rotating in concert with said shaft, and
   first pick-up means for sensing the angular position of said first driven means,
   and wherein said second sensing means comprises
   second driven means,
   second pick-up means for sensing the angular position of said second driven means, and
   means for adjustably affixing said second driven means to rotate in concert with said shaft, whereby the position of said second driven means is accurately related to the relative position of said first sensing means to selectively determine the specific position at which deenergization of said first energizing means will occur.

3. Article-handling apparatus as set forth in claim 2 wherein:
   said shaft extends in parallel relationship along said column, and
   including a rack extending along said column and a pinion attached to said shaft and in operative relation with said rack, whereby said rod rotates a predetermined number of turns corresponding to a known increment of distance under conditions where said column is traveling in said guide means along said path.

4. Article-handling apparatus as set forth in claim 3 wherein said second driven means comprises:
   a collar member attached to said shaft and having at least one signal producing element mounted thereon for rotation about the axis of said shaft, and wherein, said second pick-up means comprises,
   a sensor responsive to the signal of said signal producing element and adapted to accurately detect the presence of such element in a predetermined vicinity during rotation of said second driven means.

5. Article-handling apparatus as set forth in claim 4 wherein said sensor comprises
   switching means and
   said signal producing means is operatively coupled to said switching means under conditions where said shaft rotates said signal producing means to said predetermined vicinity.

6. Article-handling apparatus as set forth in claim 5 wherein said sensor comprises
   a reed switch and
   said signal producing means comprises a magnetic element for providing sufficient flux to close said reed switch under conditions where said magnetic element is disposed in said predetermined vicinity.

7. Article-handling apparatus as set forth in claim 5 wherein said switching means comprises:
   a mounting bracket on said column in the vicinity of said collar and
   at least one switch mounted thereon,
   and wherein
   said signal producing means is mounted on said collar and
   said collar is mounted to permit said one switch to respond to said signal producing means under conditions where said collar rotates said signal producing means past said one switch.

References Cited
UNITED STATES PATENTS

| | | | |
|---|---|---|---|
| 3,049,247 | 8/1962 | Lemelson | 214—16.4 |
| 3,139,994 | 7/1964 | Chasar | 214—16.4 |

GERALD M. FORLENZA, Primary Examiner

R. B. JOHNSON, Assistant Examiner

U.S. Cl. X.R.

318—18